(12) United States Patent
Kim et al.

(10) Patent No.: US 7,922,368 B2
(45) Date of Patent: Apr. 12, 2011

(54) LIGHT MODULE AND FLAT LIGHT UNIT IN A LIQUID CRYSTAL DISPLAY DEVICE

(75) Inventors: Jae Bum Kim, Daegu (KR); Jae Kyung Kang, Gyeonngi-do (KR); Sung Keun Lee, Gyeonggi-do (KR); Jae Jin Kim, Gyeongbuk (KR); Hyung Dong Kim, Daegu (KR); Sang Dae Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/955,029

(22) Filed: Dec. 12, 2007

(65) Prior Publication Data
US 2008/0158875 A1    Jul. 3, 2008

(30) Foreign Application Priority Data

Dec. 29, 2006  (KR) .................. 10-2006-0137414

(51) Int. Cl.
*F21V 7/00*   (2006.01)
(52) U.S. Cl. .................. 362/310; 362/334; 362/244
(58) Field of Classification Search .................. 362/249, 362/334–335, 332, 227, 244, 308, 310–311
See application file for complete search history.

(56) References Cited

U.S. PATENT DOCUMENTS

| | | | | |
|---|---|---|---|---|
| 5,836,676 A * | 11/1998 | Ando et al. | ................ | 362/244 |
| 6,200,002 B1 * | 3/2001 | Marshall et al. | ............ | 362/231 |
| 2003/0052594 A1 * | 3/2003 | Matsui et al. | ................ | 313/495 |
| 2006/0002151 A1 * | 1/2006 | Park | .............................. | 362/631 |
| 2006/0227431 A1 * | 10/2006 | Yoon et al. | .................... | 359/708 |
| 2006/0239033 A1 * | 10/2006 | Jung et al. | ..................... | 362/612 |
| 2007/0086189 A1 * | 4/2007 | Raos et al. | .................... | 362/249 |

FOREIGN PATENT DOCUMENTS

| | | |
|---|---|---|
| CN | 1716040 A | 1/2006 |
| CN | 1763603 A | 4/2006 |
| CN | 1854857 A | 11/2006 |
| JP | 09-297543 | 11/1997 |
| JP | 10-082915 | 3/1998 |
| JP | 2006-018261 | 1/2006 |
| JP | 2006-228575 | 8/2006 |
| JP | 2006-293274 | 10/2006 |
| WO | 2006/103582 A1 | 10/2006 |

OTHER PUBLICATIONS

Office Action dated Mar. 6, 2009 for Chinese Patent Application No. 2007101299769.
Office Action issued in corresponding Chinese Patent Application No. 2007101299769; issued Nov. 13, 2009.
Office Action issued in corresponding Japanese Patent Application No. 2007-164668; mailed Jan. 18, 2010.

* cited by examiner

*Primary Examiner* — Julie A Shallenberger
(74) *Attorney, Agent, or Firm* — Brinks Hofer Gilson & Lione

(57) ABSTRACT

A liquid crystal display device may include a backlight unit for providing light for the display. A backlight unit may include light modules. The light modules include colored LEDs surrounded by a first lens for refracting the light from the LEDs. A second lens surrounds the first lens for further refraction of the light to improve brightness and the uniformity of the light.

9 Claims, 9 Drawing Sheets

LIGHT MODULE AND FLAT LIGHT UNIT IN A LIQUID CRYSTAL DISPLAY DEVICE

RELATED APPLICATIONS

The present application claims priority under 35 U.S.C. 119 to Korean Patent Application No. 10-2006-0137414, filed on Dec. 29, 2006, which is hereby incorporated by reference in its entirety.

BACKGROUND

1. Field of the Disclosure

The present disclosure relates to a light emitting device. More specifically, light modules emitting white light provide light for a liquid crystal display. Additionally, the present disclosure provides a flat light unit for uniformly emitting light by using light modules, and a liquid crystal display device including the light modules.

2. Description of the Related Art

To generate a uniformly progressing light in a plane, a related art flat light unit includes a plurality of cold cathode fluorescent lamps (CCFLs) or a plurality of external electrode fluorescent lamps (EEFLs). The uniformly progressing light may be referred to hereinafter as flat light, which may originate from a flat light unit or backlight unit assembly. The CCFLs and EEFLs are disposed in parallel to generate a flat light having a predetermined area. These CCFLs and EEFLs require relatively large power consumption and may also require a larger or thicker flat light unit to accommodate the size of CCFLs and EEFLs. Additionally, it is difficult to generate a white light by combining a red light, a green light, and a blue light in these CCFLs and EEFLs.

As a result of this disadvantage of the CCFLs and EEFLs, a flat light device may include a light emitting diode (LED). The LEDs may be disposed in a plane. The LED consumes less power and may also be smaller and/or thinner, allowing for an easier change of the size of the flat light unit compared to the CCFLs and EEFLs. Furthermore, a white light may be generated by combining red, green, and blue in the LED. Accordingly, a flat light unit including an LED (hereinafter, a LED-type flat light unit) has become more common.

To generate a white flat light, the LED-type flat light unit includes red, green, and blue LEDs that are arranged alternately in perpendicular and horizontal direction. The red, green, and blue LEDs each include a side emitter lens (not shown). The respective red, green, and blue LEDs arranged in a plane, as illustrated in FIG. 1, emit light in a side direction. In other words, each of the red, green, and blue LEDs emits light that progresses within a predetermined angle range with respect to the plane of the LEDs. In other words, the light emitted from the side of the LEDs includes a range of light rays that pass within a known angular range with respect to the plane.

The red, green, and blue lights emitted within a predetermined angle with respect to the plane are combined to form white light. A diffusion sheet with a high haze and a thick polymethyl metha-acrylate (PMMA) plate are used in the flat light unit to improve the light distribution based on the emission of the light from the sides of the LEDs. The red, green, and blue lights progressing in a diagonal direction change direction into a substantially perpendicular direction by using the diffusion sheet and the PMMA plate. The diagonal direction may include any non-perpendicular direction from an LED. The light is redirected to be more generally perpendicular to the plane. However, a loss of light occurs due to the diffusion sheet. Additionally, the flat light unit may not be slim due to the thickness of the PMMA plate. Furthermore, it may be difficult to maintain a combination balance of the red, green, and blue lights in the white light that is progressing in the generally perpendicular direction from the plane.

These problems may be evident in a liquid crystal display (LCD) device in which the LED-type flat light unit is used as a backlight unit. FIG. 2 is an exploded perspective view of a liquid crystal display device including a related art LED-type back light unit. The liquid crystal display device of FIG. 2 includes a backlight unit 20 disposed below a liquid crystal panel 10. A top case 30 surrounds the edge of the liquid crystal panel 10 and the sides of the back light unit 20.

The backlight unit 20 includes a reflective sheet 24, an optical sheet set 28 and a rectangular main support 26. The reflective sheet 24, optical sheet set 28 and rectangular main support 26 are sequentially stacked on a bottom cover 22. A plurality of LED array substrates 40 are disposed in a common plane on the surface of the bottom cover 22. Each of the LED array substrates 40 includes a plurality of LEDs 42. The LEDs 42 on the LED array substrates 40 are exposed toward the upper surface of the reflective sheet 24 through a corresponding through-hole 24A on the reflective sheet 24. The through-holes 24A may be referred to as holes and are configured to correspond with the LEDs 42.

The plurality of LEDs 42 includes red, green, and blue LEDs. The red, green and blue LEDs each include a side emitter lens (not shown). Each of the red, green, and blue LEDs 42 emits light progressing within a predetermined angle range with respect to a plane parallel to the array substrates 40. The light progresses within a predetermined angle range with respect to the plane so that the red, green, and blue lights from the LEDs 42 is combined to form white light.

The reflective sheet 24 reflects the light that is reflected by the liquid crystal panel 10 back toward the rear of the liquid crystal panel 10 again, thereby improving light usage efficiency. The main support 26 receives and supports the optical sheet set 28 and supports the edge of the liquid crystal panel 10. The optical sheet set 28 causes the white light diagonally (or non-perpendicularly) emitted from the LEDs 42 to progress substantially perpendicular to the plane and towards the rear of the liquid crystal panel 10. To alter the angle of the diagonally emitted light from the LEDs, the optical sheet set 28 includes a PMMA sheet 28A, a diffusion sheet 28B having a high haze, and light concentrating sheets 28C.

The PMMA sheet 28A, as illustrated in FIG. 3, is disposed between the red, green, and blue LEDs 42 and the diffusion sheet 28B. The PMMA sheet 28A changes a progressing direction of red, green, and blue lights that diagonally enter from the red, green, and blue LEDs 42. The diagonal lights are transmitted more toward a perpendicular direction.

The diffusion sheet 28B again changes the direction of the red, green, and blue lights that diagonally entered from the PMMA sheet 28A toward the rear of the liquid crystal panel 10 in a perpendicular direction. The light concentrating sheets 28C causes the red, green, and blue lights from the diffusion sheet 28B to focus on the rear of the liquid crystal panel 10.

Drive integrated circuits (ICs) 12 are installed on or connect to a portion of the edges of the liquid crystal panel 10. The drive ICs 12 drive the liquid crystal panel 10 by a pixel region according to pixel data. The liquid crystal panel 10 transmits a plane white light from the backlight unit 20 (i.e., light concentrating sheets 28C) in an amount corresponding to a gray scale of the pixel data at each pixel region for the display.

Accordingly, a diffusion sheet with a high haze and a thick PMMA plate are used in the flat light unit. The diffusion sheet results in a loss of light such that an image brightness displayed on the liquid crystal panel deteriorates. Furthermore, the loss of a large amount of light unbalances the red, green, and blue lights constituting the white light. This may result in the deterioration of the color clearness of an image displayed on the liquid crystal panel, which reduces image quality. In addition, due to the thickness of the PMMA plate, it may be difficult to reduce the thickness of the liquid crystal display device.

BRIEF SUMMARY

Accordingly, the present embodiments are directed to a liquid crystal display device that substantially obviates one or more problems due to limitations and disadvantages of the related art. Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

In a first aspect, a liquid crystal display device includes a liquid crystal panel coupled with a reflective sheet. A substrate is coupled with the reflective sheet and includes a plurality of light modules. The light modules include at least one light emitting diode (LED) and a first lens covering the at least one light emitting diode. The light modules also include a second lens, coupled with the first lens, that includes a concave portion disposed over the first lens. The first lens and the second lens are configured to refract light from the at least one LED and the light module is configured to provide light through the liquid crystal panel.

In a second aspect, a backlight unit assembly includes a main support coupled with a reflective sheet that includes a plurality of holes. An array substrate is coupled with the reflective sheet and includes a plurality of light modules which correspond with the plurality of holes. The plurality of light modules are disposed adjacent the reflective sheet through the plurality of holes. The light modules include a first lens configured to surround at least one light emitting diode (LED) and a second lens including a concave portion configured to surround the first lens. The light emitted from the at least one LED passes through the first lens and the second lens.

In a third aspect, a light module for emitting light in a display device includes at least one LED coupled with an array substrate and configured to provide light. A first lens is disposed on the array substrate over the at least one LED. A second lens including a concave portion is disposed over the first lens. The concave portion is an opening in the second lens that has a decreasing curvature from a top of the concave portion to a bottom of the concave portion.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Figure 1:
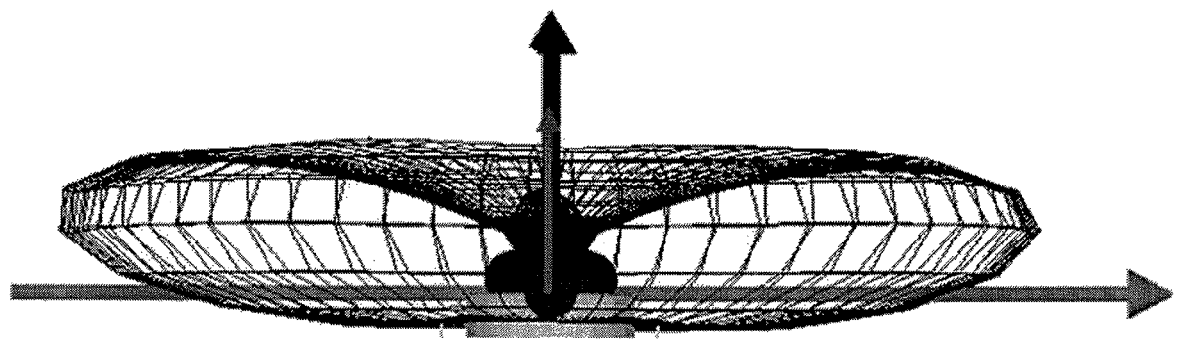
FIG. 1 is a view of radiation characteristics from a related art LED.
Figure 2:
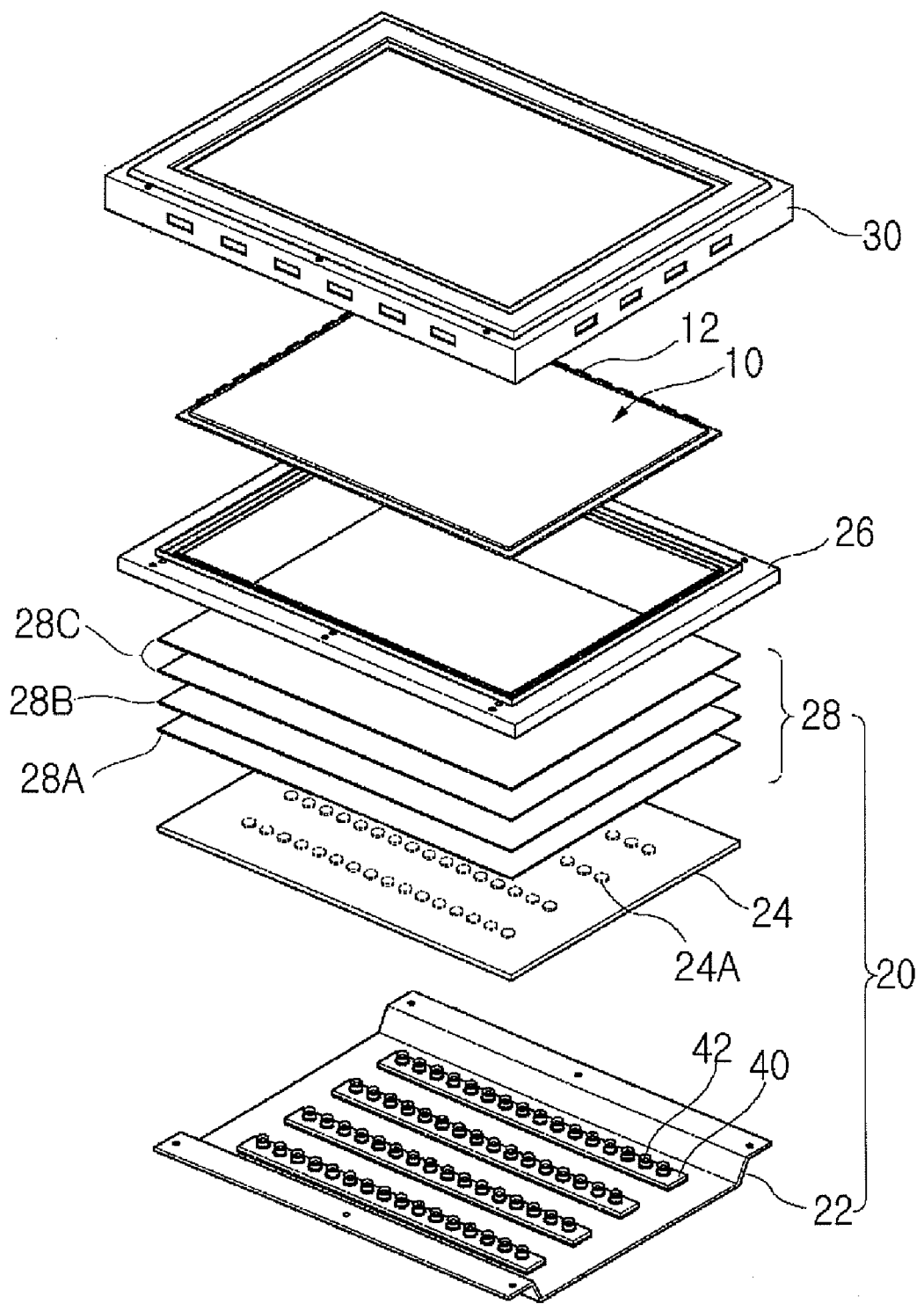
FIG. 2 is an exploded perspective view of a liquid crystal device including a related art LED-type backlight unit.
Figure 3:
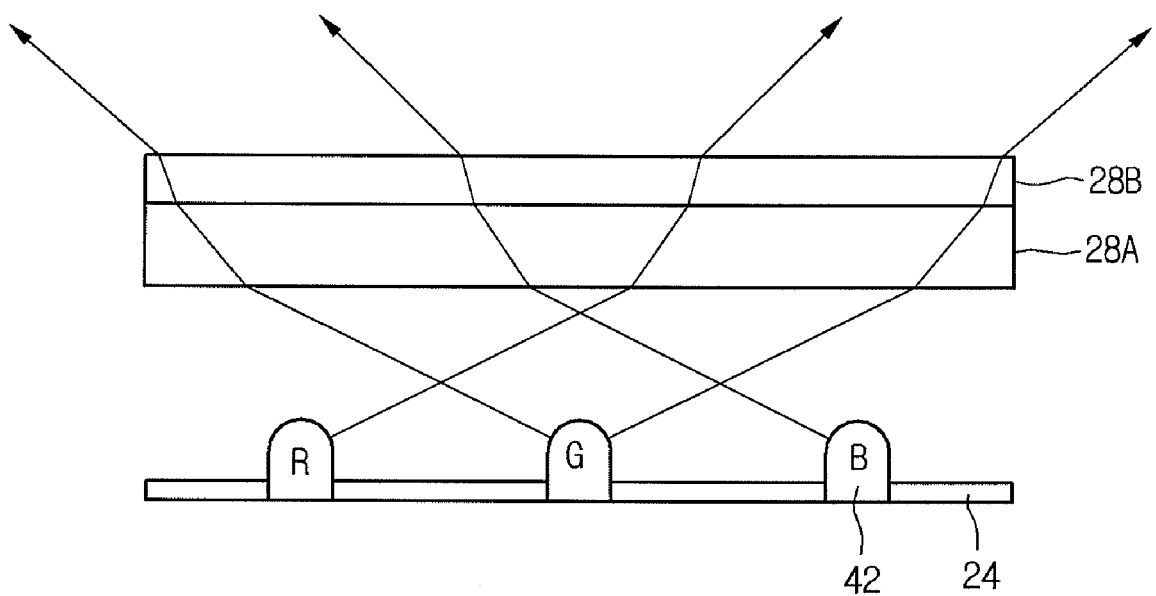
FIG. 3 is a view of the light path through a PMMA and a diffusion sheet of the related art FIG. 1.
Figure 4:
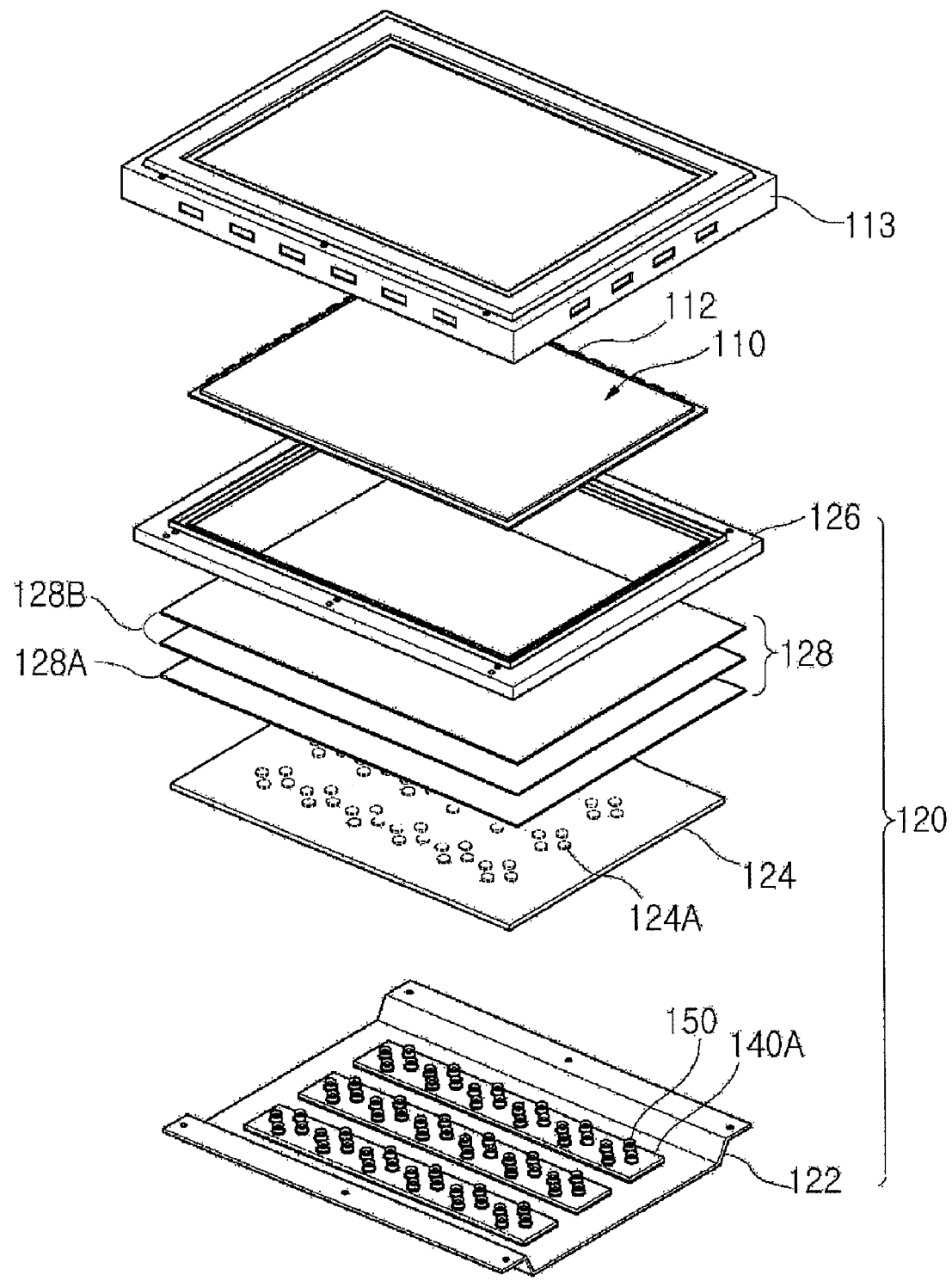
FIG. 4 is an exploded perspective view of a liquid crystal display device with a light module according to an embodiment.

FIG. 4 is an exploded perspective view of a liquid crystal display device including a light module according to one embodiment. The liquid crystal display device of FIG. 4 includes a backlight unit 120 disposed below a liquid crystal panel 110. A top case 113 surrounds the edge of the liquid crystal panel 110 and the sides of the back light unit 120.

Drive integrated circuits (ICs) 112 are disposed on or connected to a portion of the edges of the liquid crystal panel 110. The drive ICs 112 drive the liquid crystal panel 110 by a pixel region according to pixel data. The liquid crystal panel 110 transmits white light from the backlight unit 120 in an amount corresponding to a gray scale of the pixel data at each pixel region for displaying. The top case 113 protects the edge of the liquid crystal panel 110 and the sides of the backlight unit 120 from any external impact. The backlight unit 120 includes a reflective sheet 124, an optical sheet set 128, and a rectangular main support 126, which are sequentially stacked on a bottom cover 122. A plurality of light module substrates 140 are disposed in parallel on the surface of the bottom cover 122. Each of the LED substrates 140 includes a plurality of light modules 150.

The light modules 150 on the light module substrate 140 are exposed toward the upper surface of the reflective sheet 124 through a corresponding through-hole 124A on the reflective sheet 124. In one embodiment, each of the light modules 150 corresponds with a through-hole 124A on the reflective sheet 124. Each of the light modules 150 are exposed through the reflective sheet 124 at the corresponding through-holes 124A. The through-holes 124A may also be referred to as holes. In one embodiment, the through-holes 124A are round and of a slightly larger diameter than the light modules 150. Alternatively, the through-holes 124A may be of a variety of shapes such that the light modules 150 will fit through the hole.

As described, a light module 150 may include a light source and at least one lens for that light source. The light module may be referred to as a light cube, light component, light portion, or light provider. As described herein, the light module 150 may include a plurality of LEDs which are covered by a first lens and a second. Light from the LEDs is refracted by the first lens and then further refracted by the second lens such that at least a portion of the light is emitted at a predetermined angle range. Embodiments of the first lens and the second lens are described below, but are merely exemplary. The shape of the light module 150 may vary in various embodiments or equivalents.

Each of the light modules 150 emits a range of white light progressing toward a perpendicular center axis, where the range of light is within a predetermined angle degree with respect to the perpendicular center axis. The perpendicular center axis is perpendicular to the plane of the display. The white light from each of the light modules 150 maintains a uniform combination balance and intensity of red, green, and a blue lights within a radiation angle. The reflective sheet 124 re-reflects any light that is reflected by the liquid crystal panel 110 toward the rear of the liquid crystal panel 110. This re-reflection improves light usage efficiency. The reflective sheet 124 may be coupled with the liquid crystal panel 110. Herein, the phrase "coupled with" is defined to mean directly connected to or indirectly connected through one or more intermediate components.

The main support 126 receives and supports the optical sheet set 128 and supports the edge of the liquid crystal panel 110. The optical sheet set 128 causes the white light emitted from the light modules 150 to be more uniformly and parallely projected toward the rear of the liquid crystal panel 110. In one embodiment, the optical sheet set 128 includes a diffusion sheet 128A and a light concentrating sheet 128B.

The diffusion sheet 128A causes the white light (i.e., red, green, and blue lights) entering through the sheet 128A to more perpendicularly progress toward the rear of the liquid crystal panel 110. The diffusion sheet 128A uses a low-haze diffusion that minimizes the amount of light lost by the diffusion sheet 128A.

The light concentrating sheets 128B projects most of the white light from the diffusion sheet 128A into the rear of the liquid crystal panel 110. The optical sheet set 128 may be disposed close to a plane of the light modules 150. This causes the white light (i.e., red, green, and blue lights) progressing in a generally perpendicular direction to the plane of the optical sheet set 128 to be emitted in a broader radiation angle range, obviating the need for a related art PMMA plate. Since the PMMA plate is no longer used, a flat light unit may be used as a backlight unit 120 of the liquid crystal display device, which may reduce the overall thickness of the device. Furthermore, the white light maintains a uniform combination balance and intensity of the red, green, and blue lights over entire surface of the liquid crystal panel 110. In addition, the color combination and brightness of an image are uniformly displayed. Consequently, the liquid crystal display device of the present embodiments may provide an improved image quality.

Figure 5:
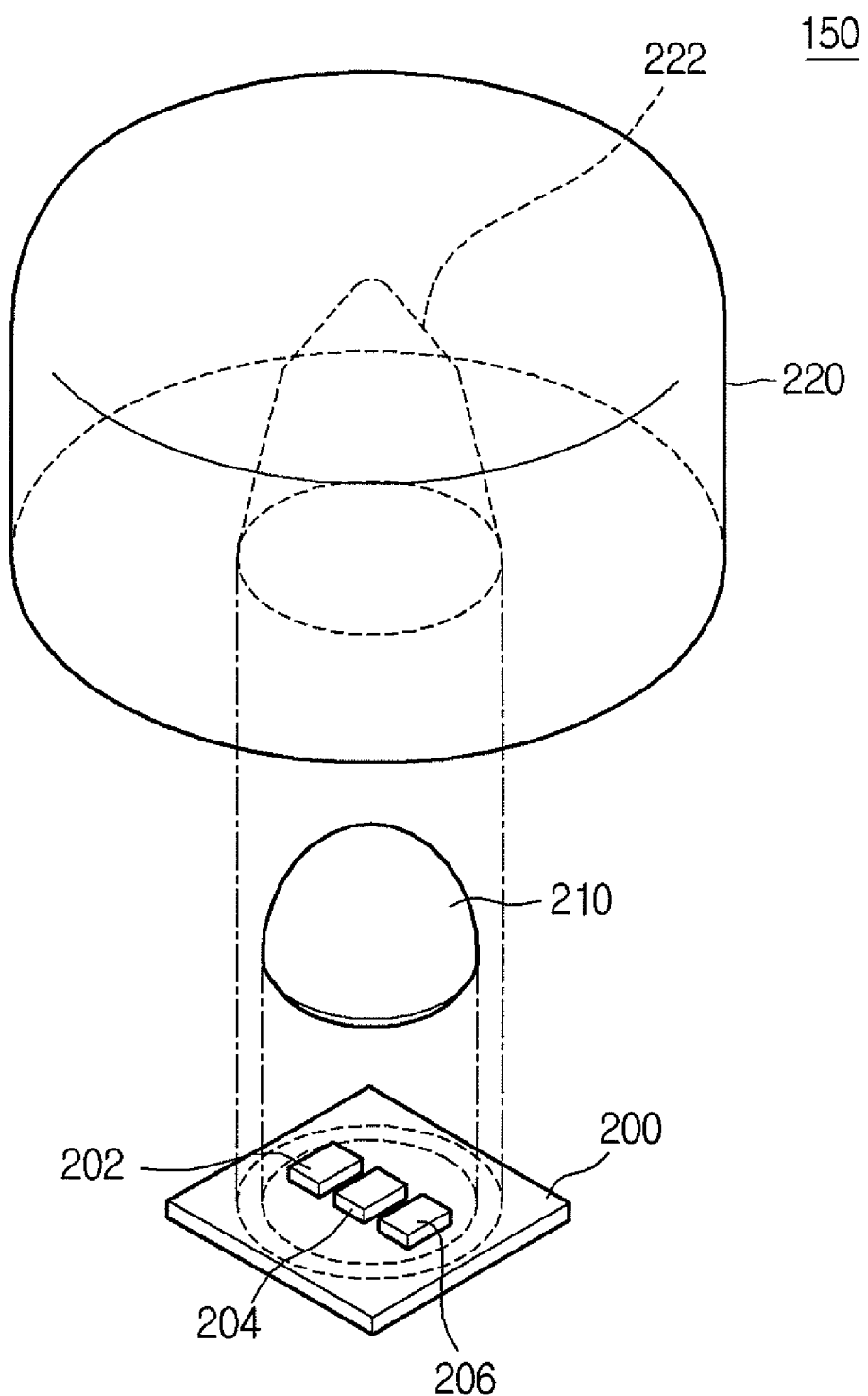
FIG. 5 is an exploded perspective view of the light module of FIG. 4.
Figure 6:
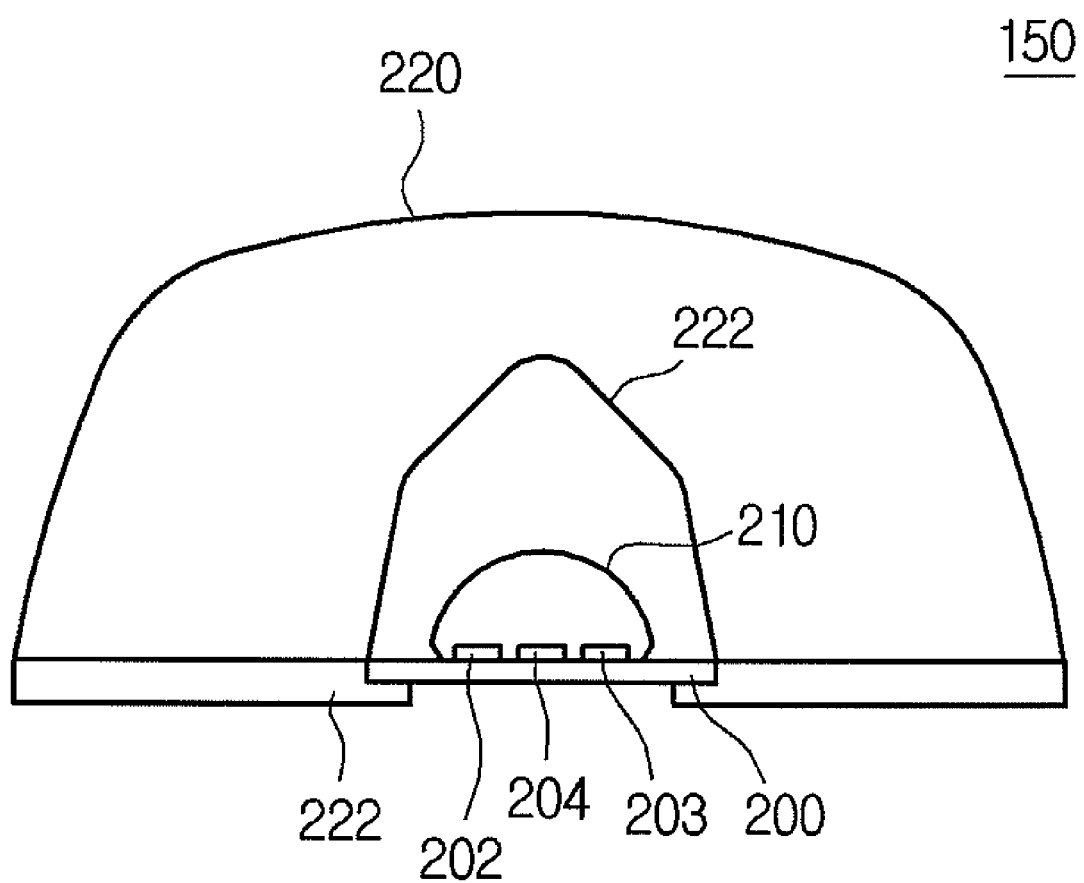
FIG. 6 is a sectional view taken along the diameter of the light module of FIG. 5.

FIG. 5 is an exploded perspective view of the light module 150 of FIG. 4. FIG. 6 is a sectional view taken along the diameter of the light module 150 of FIG. 5.

As illustrated in FIGS. 5 and 6, the light module 150 includes a substrate 200 having red, green, and blue LEDs 202, 204, 206. The light module 150 also includes a hemispheric first lens 210 formed on the substrate 200 to cover the red, green, and blue LEDs 202 to 206, a second lens 220 receiving the first lens 210 and combined with the substrate 200. The substrate 200 includes pads (not shown) therebelow. These pads input drive voltages necessary for driving the red, green, and blue LEDs 202 to 206 in the substrate 200. The drive voltages inputted into the pads passes through a line (not shown) formed along a surface of a contact (not shown) penetrating the substrate 200. The drive voltages are supplied into the red, green, and blue LEDs 202 to 206. Each of the red, green, and blue LEDs 202 to 206 emits light radially progressing in a side direction by a drive voltage from the pads.

The hemispheric first lens 210 is configured to receive the light radially being emitted from the red, green, and blue LEDs 202 to 206. In one embodiment, the first lens 210 is a hemisphere shape that is disposed on the LEDs 202 to 206. The first lens 210 may be coupled with the LEDs 202 to 206, such that the first lens 210 covers or surrounds the LEDs 202 to 206. In alternative embodiments, the first lens 210 may be shaped differently to refract the light from the LEDs 202 to 206.

The first lens 210 refracts the light twice based on the refraction upon the light hitting the inside of the first lens 210 and then being refracted upon the light leaving the first lens 210. In particular, the red, green, and blue lights are refracted first in a direction with an angle with respect to the perpendicular center axis at respective interfaces between the first lens 210 and the LEDs 202 to 206. The refracted red, green, and blue lights are refracted again in a direction with a wider angle than the above angle at the outer surface of the first lens 210. Accordingly, the red, green, and blue lights (i.e., the components of the white light) emitted from the surface of the first lens 210 are refracted with a predetermined angle range with respect to the perpendicular center axis. This is achieved in part due to the uniform curvature of the first lens 210.

In one embodiment, the first lens 210 may be formed of material (e.g., silicon) including beads with about 2 to 20 hazes. The beads cause the red, green, and blue lights to be refracted with a predetermined angle with respect to the perpendicular center axis, and accelerate the combining of the red, green, and the blue lights. In alternative embodiments, the first lens 210 may be formed of a different material and the beads may include fewer or more hazes.

A concave portion 222 is formed in the second lens 220 to receive the first lens 210. The concave portion 222 is an opening in the second lens 220. The shape of the concave portion 222 may vary. The concave portion 222 of the second lens 220 is configured to receive the first lens 210. The size of the concave portion 222 is established such that there is a space between the first lens 210 and the concave portion 222 when the first lens is inserted into the concave portion 222. In one embodiment, the concave portion 222 has a slant surface with a large curvature on the top and a small curvature on the bottom. In other words, the concave portion 222 has a cone shape space having a large amount of curvature, a medium curvature, and a small curvature on the top, middle, and bottom, respectively.

In this embodiment, the cone shaped concave portion 222 has a curvature that becomes smaller from the top to the bottom and has a cone shaped lens surface. In one embodiment, the curvature of the different sections of the concave portion 222 decreases. Accordingly, sections of the concave portion 222 are not curved with respect to the perpendicular center axis, but rather have a consistent angle. The angles of the sections of the concave portion 222 may change throughout. As the curvature becomes smaller from the top to the bottom, the red, green, and blue lights are refracted with a smaller angle with respect to the perpendicular center axis at the surface of the concave portion 222.

In particular, the top of the concave portion 222 enables the red, green, and blue lights entering thereto to be refracted with a large angle with respect to the perpendicular center axis so that they go away from the perpendicular center axis. Conversely, the red, green, and blue light entering at the declined bottom portion of the concave portion 222 are refracted with a small angle opposite the perpendicular center axis to come near the perpendicular center axis. Accordingly, the light is refracted at the surface of the concave portion 222 and then uniformly emitted and distributed within 67.5° with respect to the perpendicular center axis. The space between the first lens 210 and the second lens 220 may operate as a third lens to make more refraction at the surface of the first lens 210 and the concave surface of the second lens 220.

The outer surface of the second lens 220 includes a top surface and a side surface each having a small amount of curvature, and an edge having an amount of curvature that gradually increases and then decreases. The edge is formed where the top surface meets the side surface. Accordingly, the outer surface of the second lens 220 includes a curvature that decreases from the edge to the perpendicular center axis and decreases from the edge to the bottom. The edge of the second lens 220 refracts the red, green, and blue lights toward both the perpendicular center axis of the light module and to the bottom. This refracted light will diffused. In other words, the light refraction angle gradually decreases from the edge to the bottom and from the edge to the perpendicular center axis. Consequently, the light is uniformly distributed within a predetermined angle with respect to the perpendicular center axis. Furthermore, like the first lens 210, the second lens 220 may include beads with 2 to 20 hazes. These beads make a uniform combination of the red, green, and blue lights, and a larger radiation angle with respect to the perpendicular center axis.

Figure 7:
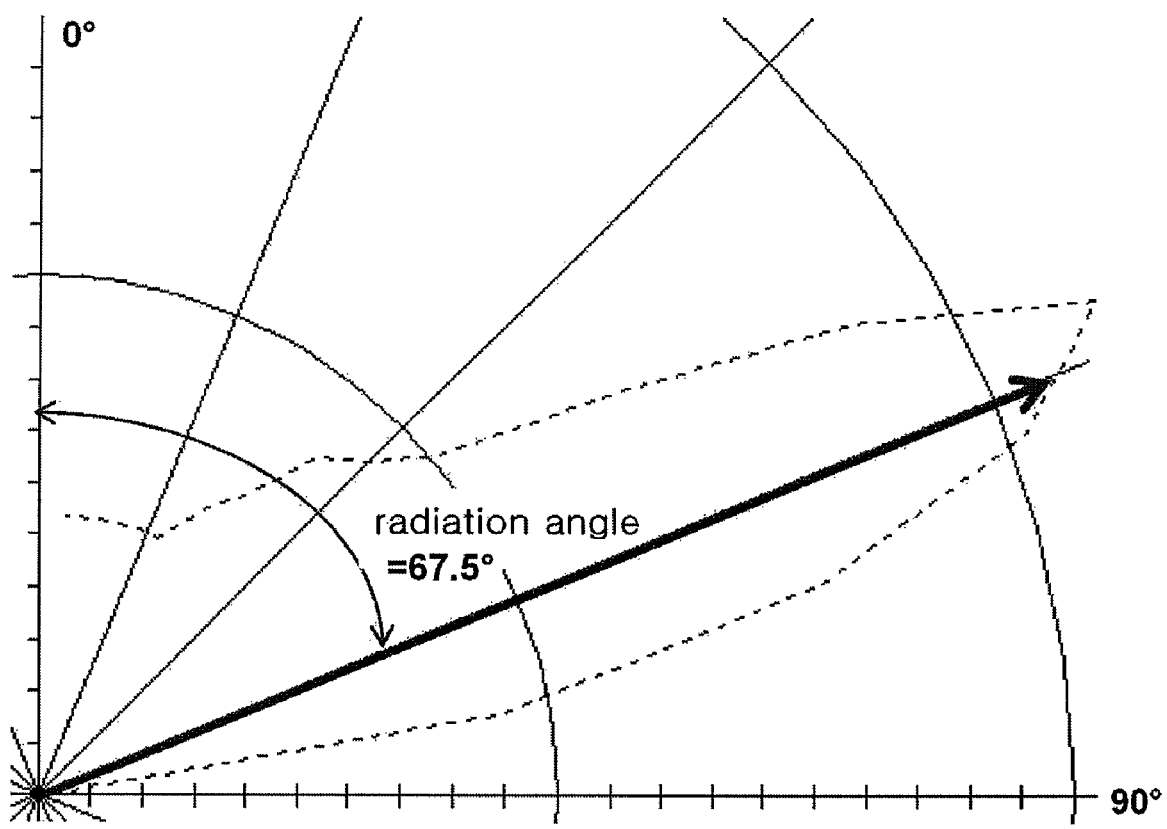
FIG. 7 is a view of a radiation angle characteristic of the light module of FIG. 4.

Accordingly, in one embodiment, the radiation angle of the light emitted from the light module 150 may increase more than 67.5° as shown in FIG. 7 and up to 70° with respect to the perpendicular center axis. The surface of the first lens 210, the surface of the concave portion 222 in the second lens 220, and the outer surface of the second lens 220 may be formed to be mirror image shapes. The inner surface second lens 220 may be such that the concave portion 222 is shaped similar to the shape of the first lens 210. Likewise, the shape of the first lens 210 may be similar to the concave portion 222 in the second lens 220.

Figure 8:
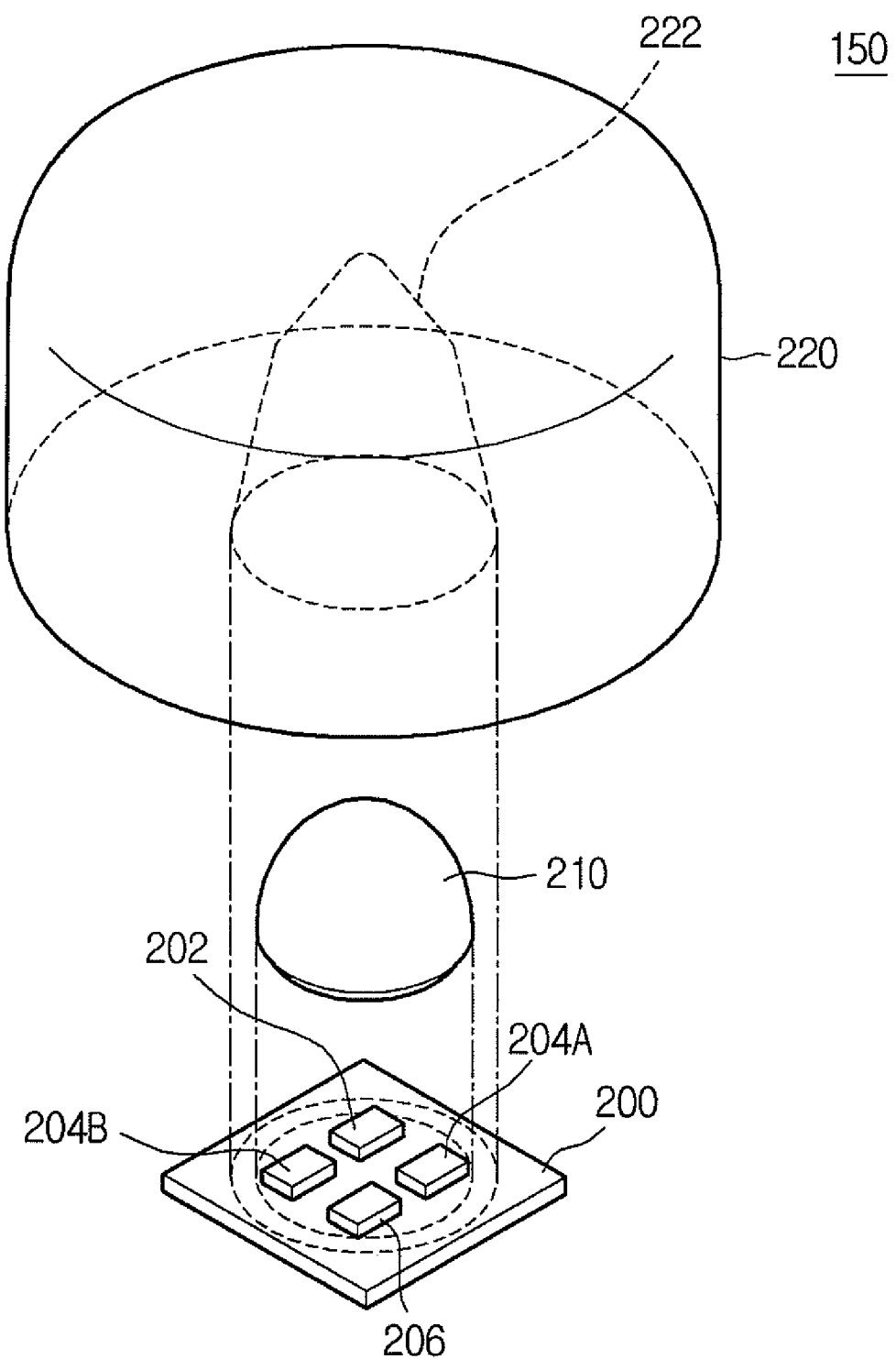
FIG. 8 is an exploded perspective view of another embodiment of the light module of FIG. 4.
Figure 9:
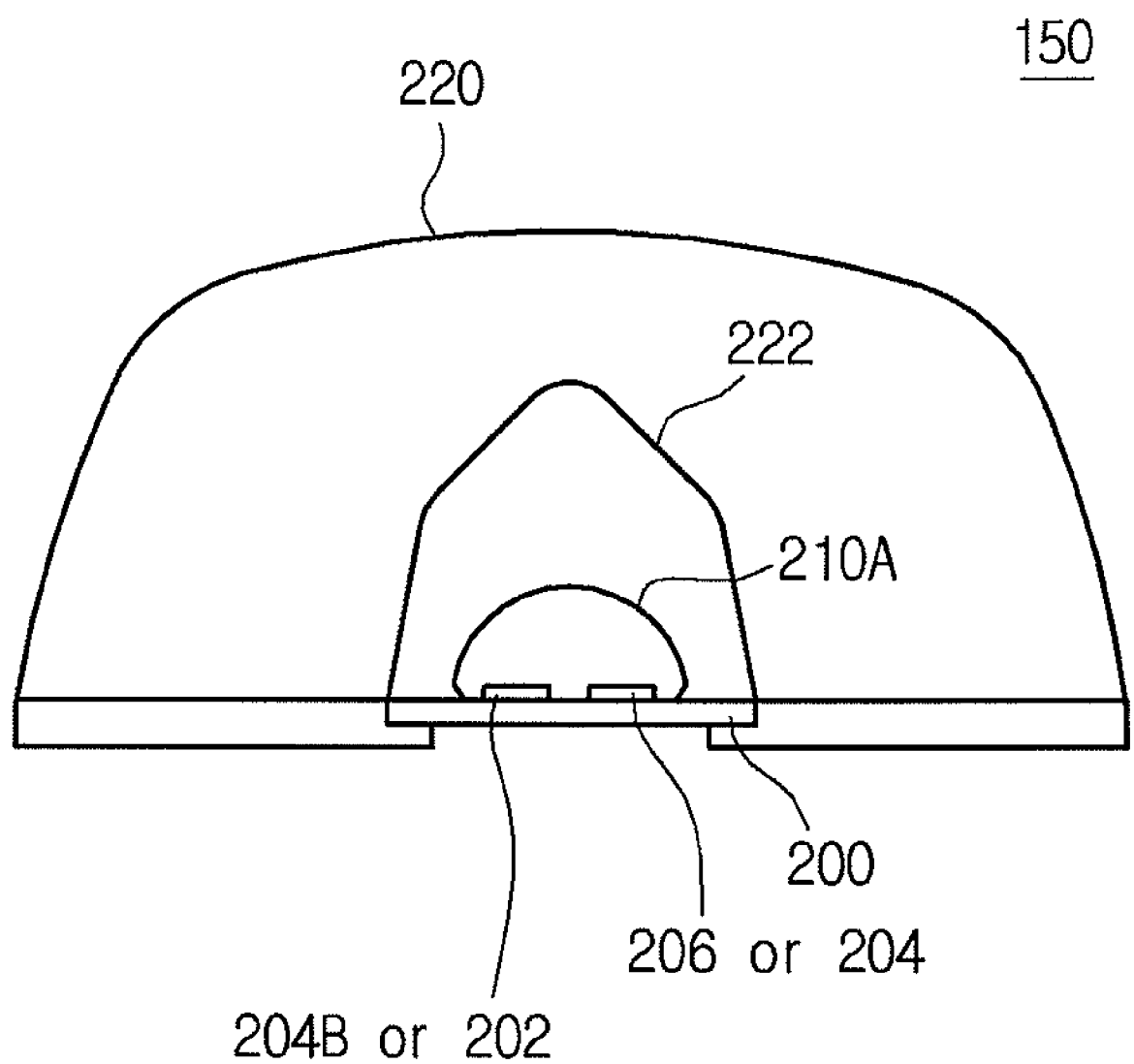
FIG. 9 is a sectional view taken along the diameter of the light module of FIG. 8.

FIG. 8 is an exploded perspective view of another embodiment of the light module 150 of FIG. 4. FIG. 9 is a sectional view taken along the diameter of the light module 150 of FIG. 8.

The light module 150 of FIGS. 8 and 9 is similar to that of FIG. 5 except that one green LED 204 is replaced with two green LEDs 204A and 204B. The two green LEDs 204A and 204B are disposed adjacent to the red and blue LEDs 202 and 206. In one embodiment, the two green LEDs 204A and 204B are diagonal from each other, with the blue LED 206 diagonal from the red LED 202. Wherever possible, the same reference numbers will be used throughout the drawings to refer to the same or like parts. The two green LEDs 204A and 204B may be disposed adjacent from the red and blue LEDs 202 and 206 and diagonal from one another to increase a color combination of the red, green and the blue colors.

As described above, the light module of the present embodiments has different curvature surfaces surrounding the red, green, and the blue LEDs. The respectively different curvatures makes the light from the red, green, and the blue LEDs uniformly radiate within a large angle range with respect to the perpendicular center axis. The red, green, and blue are uniformly combined into the white light. Accordingly, as an amount of light emitted from the light module increases, the red, green, and the blue lights are uniformly mixed to form a white light. As a result, brightness, color combination, and brightness uniformity increases in a flat light device using a light module and a liquid crystal display device using a backlight with the light module. Also, this may allow the device to have a smaller thickness.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A backlight unit comprising:
a second substrate including at least one light cube, the light cube having: red, green, and blue light emitting diodes disposed on a first substrate;
a first lens disposed on the first substrate to cover the red, green, and blue light emitting diodes;
a second lens having a concave portion that receives the first lens and forming a space between the first lens and the second lens;
a diffusion sheet disposed on a reflective sheet;
a light concentrating sheet disposed on the diffusion sheet,
wherein the first lens is formed of a silicon material and has a hemispheric shape that is disposed on the red, green and blue light emitting diodes,
wherein the concave portion has a slant surface and a space with a curved surface including a large amount of curvature, a medium curvature, and a small curvature on the top, middle and bottom, respectively,
wherein the space between the first lens and second lens operates as a third lens to make more refraction at the surface of the first lens and the concave surface of the second lens,
wherein the concave portion of the second lens includes an inner surface having a pentagon shaped surface in cross section along a light emitting axis of the light cube wherein the pentagon shaped surface has one of five sides open to receive the first lens and the first substrate.

2. The backlight unit according to claim 1, wherein the first lens comprises an outer surface having a constant curvature.

3. The backlight unit according to claim 1, wherein the concave comprises a curvature that gradually decreases from the top to the bottom.

4. The backlight unit according to claim 1, wherein at least one of the first lens and the second lens comprises beads with 2 to 20 hazes.

5. The backlight unit according to claim 1, further comprising a second green LED on the substrate, the second green LED and the green LED being disposed perpendicularly to the red and blue LEDs.

6. A liquid crystal display device comprising:
a flat light device; and
a liquid crystal panel adjusting a transmission amount of light from the flat light device,
wherein the flat light device comprising:
a second substrate including at least one light cube, the light cube having: red, green, and blue light emitting diodes disposed on a first substrate; a first lens disposed on the first substrate to cover the red, green, and blue light emitting diodes; and a second lens having a concave portion that receives the first lens and forming a space between the first lens and the second lens;
a diffusion sheet disposed on a reflective sheet; and
a light concentrating sheet disposed on the diffusion sheet,
wherein the first lens is formed of a silicon material and has a hemispheric shape that is disposed on the red, green and blue light emitting diodes, wherein the concave portion has a slant surface and a space with a curved surface including a large amount of curvature, a medium curvature, and a small curvature on the top, middle and bottom, respectively, wherein the concave portion of the second lens includes an inner surface having a pentagon shaped surface in cross section along a light emitting axis of the light cube wherein the pentagon shaped surface has one of five sides open to receive the first lens and the first substrate, wherein the space between the first lens and second lens operates as a third lens to make more refraction at the surface of the first lens and the concave surface of the second lens, wherein the first lens refracts the light twice based on the refraction upon a red, green and blue light hitting the inside of the first lens and then being refracted upon the light leaving the first lens.

7. The liquid crystal display device according to claim 6, wherein the first lens comprises an outer surface having a constant curvature.

8. The liquid crystal display device according to claim 6, wherein the concave comprises a curvature that gradually decreases from the top to the bottom.

9. The liquid crystal display device according to claim 6, wherein at least one of the first lens and the second lens comprises beads with 2 to 20 hazes.

* * * * *